(12) United States Patent
Downey (10) Patent No.: US 8,092,119 B2
(45) Date of Patent: Jan. 10, 2012

(54) PIPELINE BUOYANCY CONTROL ASSEMBLY AND TIEDOWN

(75) Inventor: Shawn D Downey, Columbia, MO (US)

(73) Assignee: Hubbell Incorporated, Shelton, CT (US)

(*) Notice: Subject to any disclaimer, the term of this patent is extended or adjusted under 35 U.S.C. 154(b) by 862 days.

(21) Appl. No.: 11/808,762

(22) Filed: Jun. 12, 2007

(65) Prior Publication Data

US 2008/0310922 A1 Dec. 18, 2008

(51) Int. Cl.
*F16L 1/20* (2006.01)

(52) U.S. Cl. ............ 405/172; 405/171; 405/184.4; 248/499

(58) Field of Classification Search .......... 405/158, 405/171, 172, 184.4; 248/49, 505, 507, 508, 248/499; 52/4, 155; 4/679, 288
See application file for complete search history.

(56) References Cited

U.S. PATENT DOCUMENTS

| | | | |
|---|---|---|---|
| 3,568,455 A | 3/1971 | McLaughlin et al. | |
| 4,338,045 A | 7/1982 | Cour | |
| 4,770,378 A | 9/1988 | Onishi et al. | |
| 5,730,552 A | 3/1998 | Johannesson et al. | |
| 5,785,457 A | 7/1998 | Thompson et al. | |
| 5,848,776 A * | 12/1998 | Craig et al. | 248/505 |
| 6,132,141 A * | 10/2000 | Kirk | 405/172 |
| 6,298,611 B1 | 10/2001 | Oliver et al. | |
| 6,971,826 B2 * | 12/2005 | Valentine | 410/50 |
| 2008/0310922 A1 | 12/2008 | Downey | |

FOREIGN PATENT DOCUMENTS

DE 19522014 A1 1/1997

* cited by examiner

*Primary Examiner* — John Kreck
*Assistant Examiner* — Sean Andrish
(74) *Attorney, Agent, or Firm* — Kevin M. Barner; Mark S. Bicks; Alfred N. Goodman (57) ABSTRACT

A pipeline buoyancy control assembly is operable to simultaneously retain a plurality of pipelines against buoyancy forces. Respective ends of two retaining straps corresponding to two respective pipelines engage a tie-down member of a single control assembly. The retaining straps are placed over the respective pipelines and other ends of the retaining straps are attached to additional control assemblies. Further, stresses exerted on the retaining straps when the pipelines are subjected buoyancy forces are minimized by the unique structure of the tie-down member and the manner by which the retaining straps attached thereto.

8 Claims, 6 Drawing Sheets

PIPELINE BUOYANCY CONTROL ASSEMBLY AND TIEDOWN

FIELD OF THE INVENTION

The present invention generally relates to a tie-down assembly for a pipeline and, more particularly, the invention relates to a tie-down assembly and a tie-down attachment member therefor for retaining a pipeline against buoyancy forces, such as those forces experienced continuously by a submerged oil or gas pipeline or experienced by a pipeline buried in soil with the water table located at or above the pipeline.

BACKGROUND OF THE INVENTION

Pipelines, such as oil and gas pipelines, often need to be anchored or otherwise stabilized. For example, underwater pipelines and pipelines buried near or in saturated soils are buoyant and, thus, have a tendency to float. To prevent damage to the pipes and, thus, prevent a potential catastrophic leak of the material within the pipe, this buoyancy must be controlled. A variety of assemblies and methods are known for anchoring such pipelines. More particularly, passive gravity systems, such as weights, are common. Other known systems employ helical screw anchors with steel or polyester pipebands.

A representative example of a conventional pipeline anchor apparatus is disclosed in U.S. Pat. No. 5,730,552 ("the '552 patent") to Johannesson et al. The '552 patent discloses a pipeline anchor apparatus with left and right anchor units connected by a tie-down strap made of heavy-duty polyester or nylon webbing. Two respective tie-down brackets located on opposite sides of the pipe hold a respective end of the strap, which is placed over the top of the pipe. The brackets are attached to extension rods which are coupled to anchor rods that are driven into the ground. The tie-down brackets pivot about the extension rods to reduce stress placed on the pipe as the pipe shifts, for example, due to buoyancy forces.

The polyester tie-down strap of the '552 patent has a loop formed and sewn at each of its opposite ends. Each loop is secured to a tie-down bracket along a side thereof facing the pipeline. The tie-down brackets are mounted to extension rods which, in turn, are attached to anchor rods of the respective anchor units. Each anchor rod has a helical anchor attached thereabout. Further, each tie-down bracket has a side sleeve-like connector defining a channel or slot running alongside the bracket through which passes one of the tie-down strap loops. Each loop of the tie-down strap wraps around an outer wall of the side connector of one of the tie-down brackets.

Another representative example of previously known pipeline anchor apparatuses is disclosed in U.S. Pat. No. 6,132,141 (the '141 patent), to Kirk. The '141 patent discloses a pipeline retainer device having a pair of tie-down attachment members mounted to helical screw anchor rods. The attachment members are connected to opposite portions of a strap that holds the pipeline down. A retainer body comprising an annular shoulder portion attached to each hollow tubular mounting body distributes stress caused by shifting of the pipe at the ends of the strap.

An even further representative example of previously known pipeline anchor apparatuses is disclosed in U.S. Pat. No. 4,338,045 (the '045 patent), to Cour. Specifically, the '045 patent discloses a method and apparatus for anchoring a pipeline to a support and a sea-bed. An inflatable body is placed on the upper portion of the pipeline and a rigid saddle clamp is placed over the inflatable body and the pipe, which is coated with concrete. The ends of the saddle clamp are attached to anchors driven into the ground and the inflatable body is then filled with a settable material, such as concrete. Once the settable material has settled, any play between the pipe and the saddle clamp, particularly in the vertical direction, is removed.

None of the previously known devices and methods for retaining a buoyant pipeline, including the U.S. patents mentioned above, sufficiently account for vertical stresses exerted on the various respective tie-down straps or retainers. As a result, broken or otherwise damaged retainers and straps could result when previously known pipeline anchoring systems, such as those mentioned above, are used. Furthermore, previously known pipeline anchoring systems such as those identified above are configured to retain a single pipeline. None of the aforementioned pipeline retention systems is designed to accommodate more than one respective pipeline simultaneously.

There remains a need, therefore, for a pipeline anchoring device that addresses the aforesaid problems, and others, attendant with conventional and other previously known pipeline anchor devices and which is also easily manufactured and installed.

SUMMARY OF THE INVENTION

The present invention is directed to a tie-down assembly for a pipeline and, more particularly, to a tie-down assembly to retain a submerged buoyant pipeline, such as an oil or gas pipeline, and a tie-down attachment member therefor.

The present invention provides a pipeline buoyancy control assembly and a tie-down attachment member therefor designed to satisfy, among other things, the aforementioned needs.

A pipeline buoyancy control assembly in accordance with one embodiment of the present invention includes a tie-down device with a body portion having a center plate with two substantially flat portions disposed at each of two ends and a curved center portion disposed between the flat portions and, two opposing side plates fixedly attached to respective sides of the center plate, and an elongated hollow stem portion disposed in an aperture formed in the body portion, wherein the stem portion is fixedly attached to the body portion.

According to another embodiment of the invention, a pipeline buoyancy control assembly for retaining a buoyant pipeline is provided which includes an anchor device having at least two ends, wherein at least one of the ends is for attaching to a fixed object, a tie-down attachment member in operational engagement with an end of the anchor device, wherein the tie-down attachment member move along a length of the anchor device, rotate about an axis of the anchor device, or both. The pipeline buoyancy control assembly according to this embodiment further includes at least one tie-down strap each strap being attached to the tie-down attachment member and being operable to retain the pipeline, and a retainer device attached to the anchor device and operable to restrict the movement of the tie-down attachment member beyond a specified location on the length of the anchor device.

According to yet a further embodiment of the invention, a pipeline buoyancy control system is provided having a buoyant pipeline, first and second pipeline buoyancy control assemblies provided adjacent to and on respective sides of the buoyant pipeline, wherein each of the first and second pipeline buoyancy control assemblies is operable to retain a plurality of pipelines simultaneously, and a retainer strap engaged at respective ends thereof to the first and second pipeline buoyancy control assemblies, wherein the retainer strap retains the buoyant pipeline against buoyancy forces.

According to a yet further embodiment, a pipeline buoyancy control system is provided having at least two pipelines, a first pipeline buoyancy control assembly disposed between a first pipeline and a second pipeline, a second pipeline buoyancy control assembly disposed at an outer side of the first pipeline, a third pipeline buoyancy control assembly disposed at an outer side of the second pipeline, a first strap attached between the first and second pipeline buoyancy control assemblies and operable to retain the first pipeline, and a second strap attached between the second and third pipeline buoyancy control assemblies and operable to retain the second pipeline.

These and other features and advantages of the present invention will become apparent to those skilled in the art upon a reading of the following detailed description when taken in conjunction with the drawings wherein there is shown and described illustrative exemplary embodiments of the invention.

BRIEF DESCRIPTION OF THE DRAWINGS

The object and features of the present invention will become more readily apparent from the following detailed description of the exemplary embodiments taken in conjunction with the accompanying drawings in which.

DETAILED DESCRIPTION OF EXEMPLARY EMBODIMENTS

Non-limiting exemplary embodiments of the present invention are discussed in detail below. While specific structural configurations are disclosed, it should be understood that the exemplary structural embodiments disclosed are for illustration purposes only and are not intended to limit the scope of coverage afforded by the attendant claims provided herewith. A person skilled in the relevant art will recognize that other configurations may be used without departing from the spirit and scope of the invention.

The present invention is directed to a tie-down assembly for a pipeline and, more particularly, to a tie-down assembly for retaining one or more buoyant pipelines, such as oil or gas pipelines, and a tie-down attachment member therefor.

Figure 1:
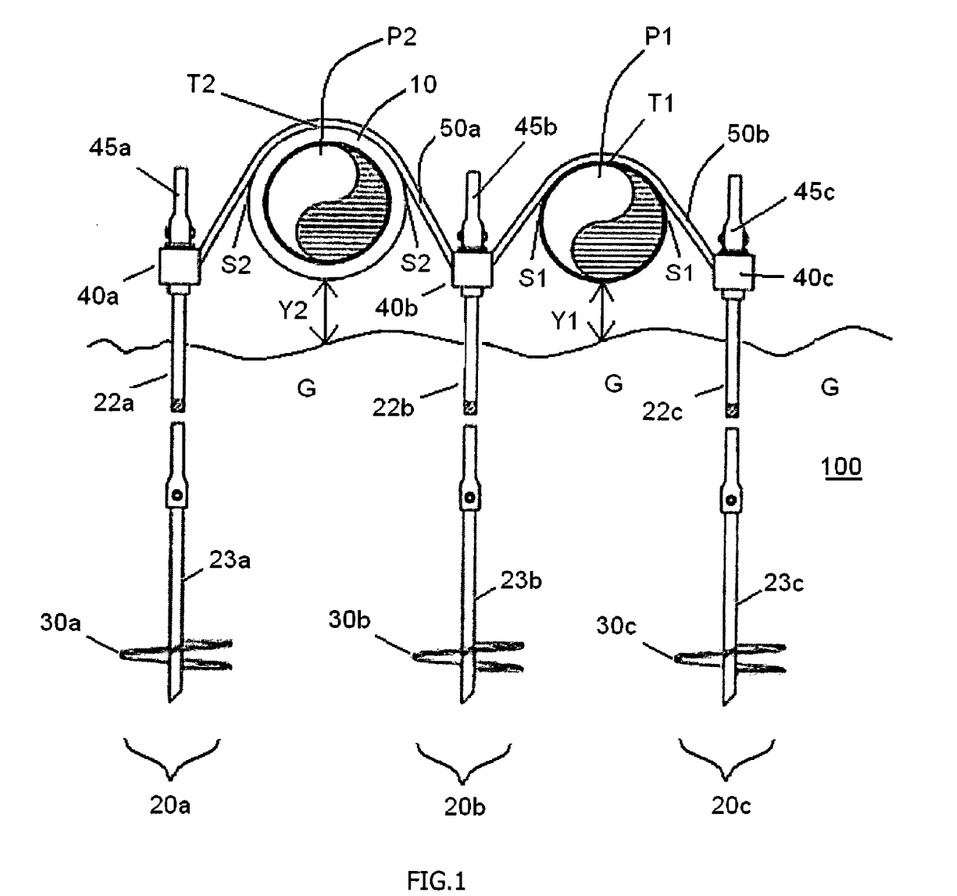
FIG. 1 is a perspective view of one exemplary embodiment according to the present invention where a plurality of pipeline buoyancy control assemblies is used to retain two different pipes.
Figure 2:
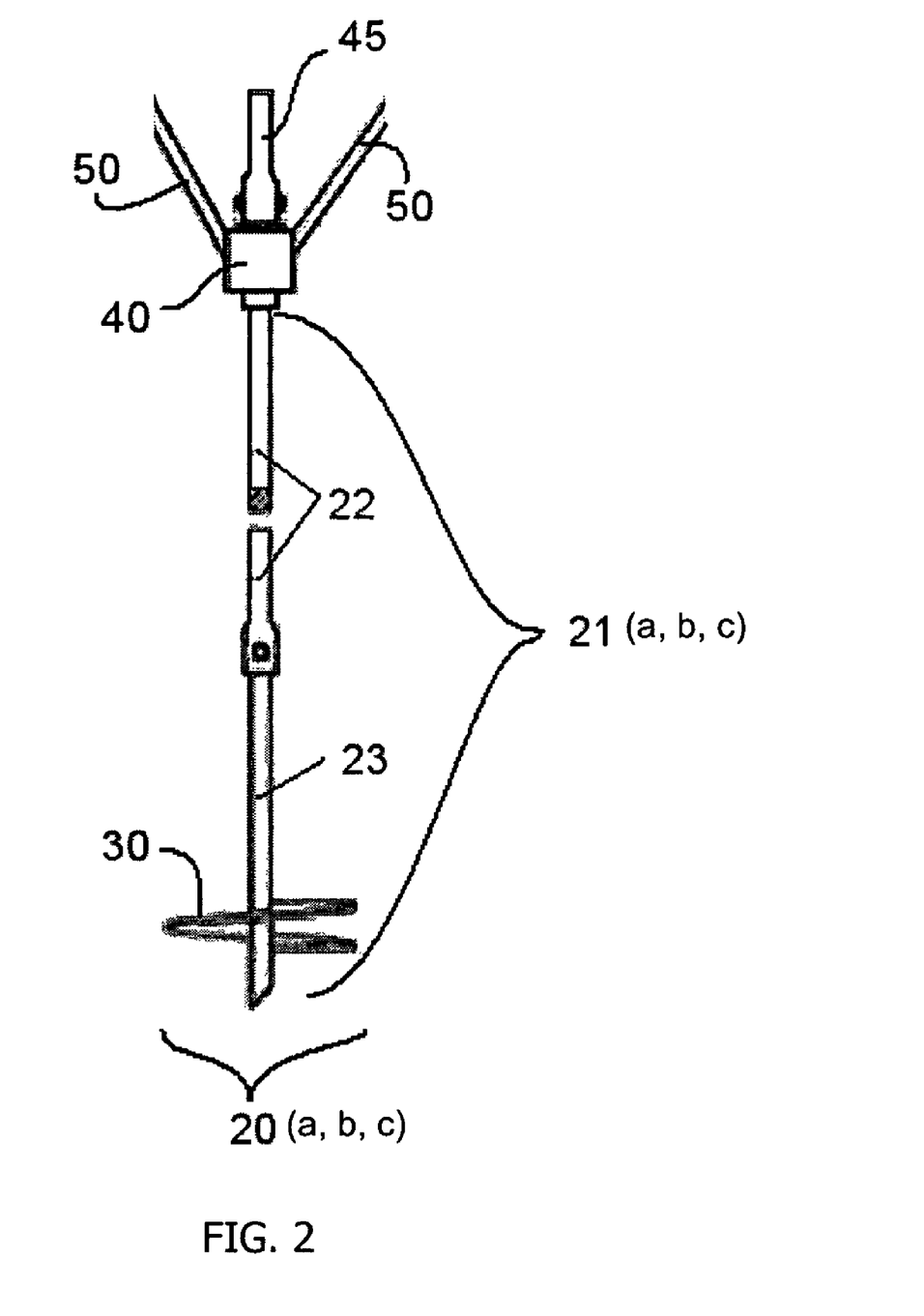
FIG. 2 is a perspective view of a single pipeline control assembly in accordance with the present invention.

Referring to the drawings and particularly to FIGS. 1 and 2, there is illustrated a plurality of pipeline buoyancy control assemblies in accordance with a non-limiting exemplary embodiment of the invention. More particularly, in FIG. 1 a plurality of exemplary pipeline buoyancy control assemblies, 20a, 20b and 20c, in accordance with the present invention are illustrated for retaining two adjacent pipelines, P1 and P2. FIG. 2 illustrates the details of a single exemplary pipeline buoyancy control assembly 20 in accordance with the invention. Further, according to the embodiment shown in FIG. 1, pipelines P1 and P2 have different diameters. Specifically, pipeline P2 has a larger diameter than pipeline P1. For example, as shown, pipeline P2 is covered with a coating 10 which renders the effective diameter of pipe P2 larger than the diameter of pipeline P1, which does not have a coating provided on its outer surface. A skilled artisan will understand that two or more pipeline buoyancy control assemblies in accordance with the present invention can be used to retain one or more pipelines, each pipe having the same or a different diameter.

Referring to FIG. 1, a plurality of pipeline buoyancy control assemblies 20a, 20b and 20c, along with retaining straps 50a and 50b, in accordance with the present embodiment are generally designated 100. Tie-down straps 50a and 50b in FIG. 1 have different lengths to accommodate the different respective diameters of pipelines P1 and P2. That is, each strap, generally designated 50 in FIG. 2, has a respective length specifically determined based on the diameter of the pipeline which it retains. However, other than having a different length, each strap in accordance with this exemplary embodiment is constructed substantially the same, as described in more detail below.

Figure 6A:
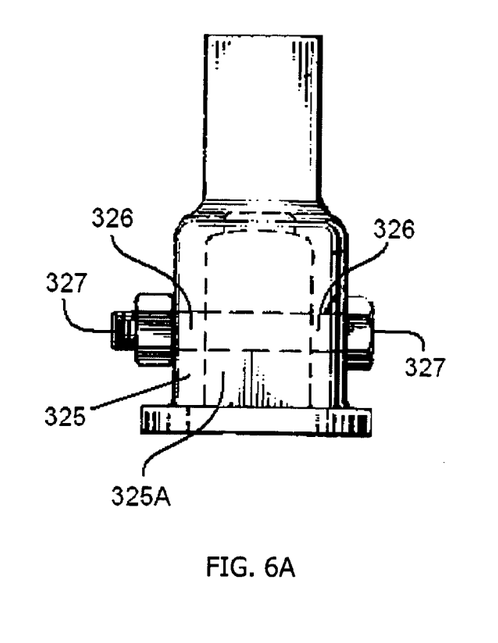
FIGS. 6A AND 6B are respective front and side perspective views of a retainer device used to retain a tie-down attachment member to an anchor rod of a pipeline buoyancy control assembly in accordance with one exemplary embodiment of the present invention.
Figure 6B:
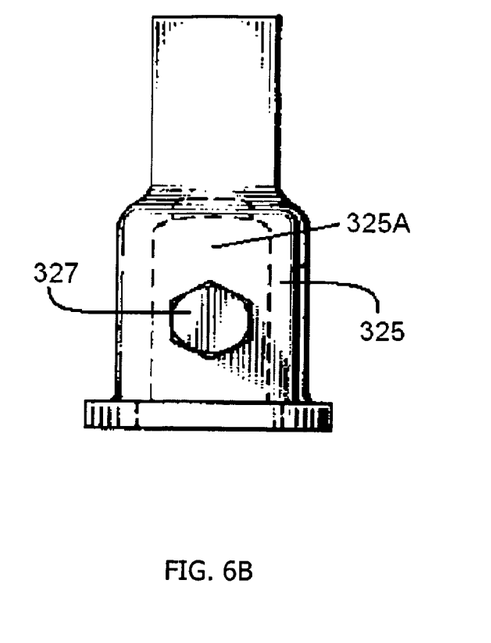

As illustrated in FIG. 1, the three anchoring devices 20a, 20b and 20c are disposed at opposite lateral sides S1 and S2, respectively, of pipelines P1 and P2 and are securable to portions of the ground, or load-bearing strata, G, beneath the pipelines P1 and P2. Each anchoring device (20a, 20b, 20c) is similar in construction, as illustrated for example in FIG. 2, and includes an extendible anchor rod (21a, 21b, 21c), the components of which are illustrated in more detail in FIGS. 6 and 7, a tie-down attachment member (40a, 40b, 40c) which itself comprises a feature of the present invention and is illustrated in detail in FIGS. 9-11 and a retainer section (45a, 45b, 45c), shown in detail in FIGS. 6A and 6B.

Figure 8:
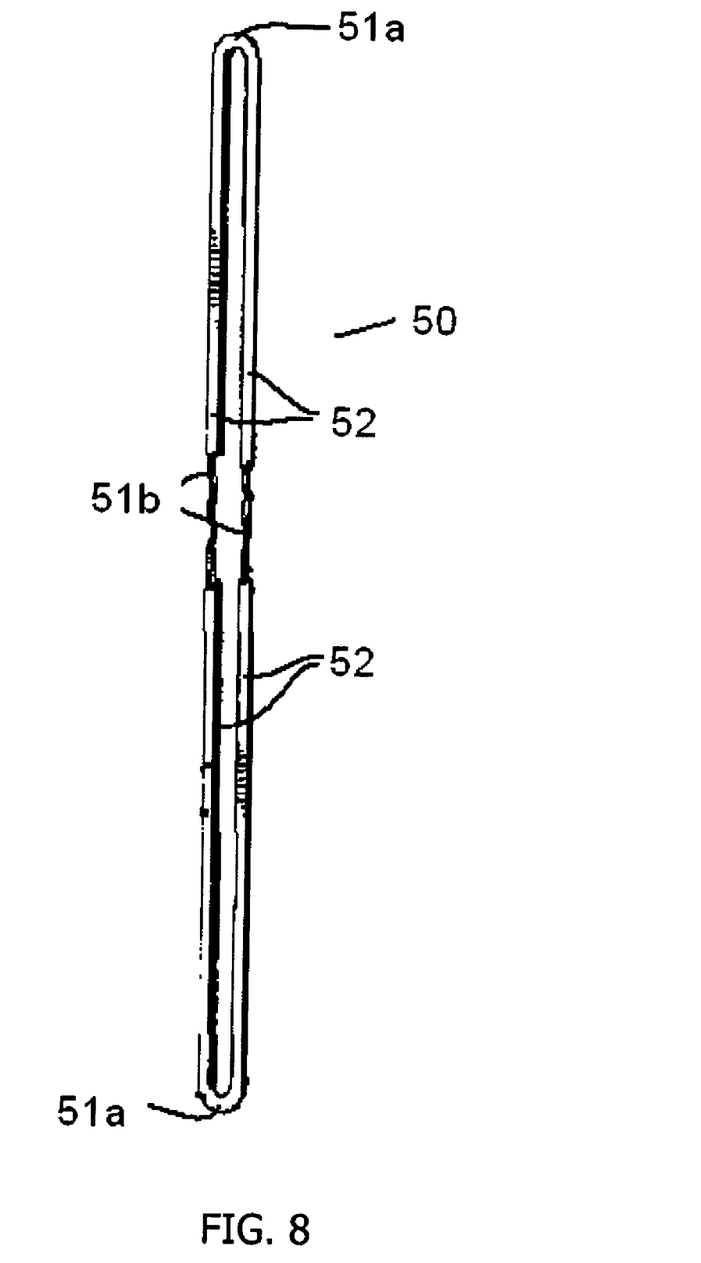
FIG. 8 is a perspective view of an endless strap used in connection with a pipeline buoyancy control assembly in accordance with one exemplary embodiment of the present invention.

As shown in FIG. 8, strap 50 (50a and 50b in FIG. 1), preferably have an endless loop configuration and include a pair of opposite end portions 51a adapted to be coupled to the anchoring devices (20a, 20b, 20c) and a pair of main portions 51b extending between and interconnecting the opposite portions 51a. Each endless strap 50 is adapted to be laid over the top of a pipeline and to extend substantially transversely to and downwardly past the opposite lateral sides of the pipeline to the opposite portions 51a of the endless strap 50. Further, an optional covering, or coating, 52, shown in FIG. 8, can be provided over the entire length, or substantially the entire length, of strap 50. Covering, or coating, 50, is preferably polyester, which protects the straps 50 from deterioration due to ultraviolet radiation and other environmental conditions, but other materials exhibiting similar properties can also be used.

Figure 3:
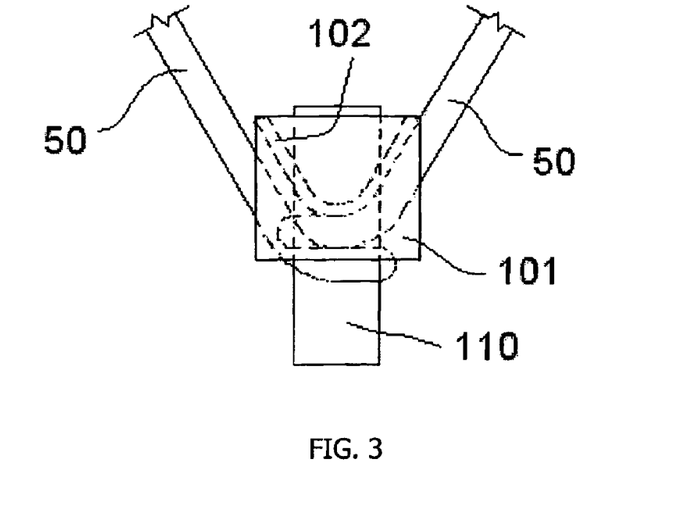
FIG. 3 is a perspective view illustrating the manner by which tie-down straps attach to a tie-down member of a pipeline buoyancy control assembly in accordance with one exemplary embodiment of the present invention.

As shown in the exemplary embodiment of FIG. 1, two straps 50a and 50b are respectively provided over the tops, T1 and T2, of pipelines P1 and P2. The tie-down attachment members (40a, 40b, 40c) of each of the anchoring devices (20a, 20b, 20c) are adapted to receive and retain the endless straps 50a and 50b at the opposite portions 51a thereof. FIG. 3 illustrates how two respective straps 50 engage a tie-down attachment member in accordance with the present invention, such as the tie-down attachment members (40a, 40b, 40c) shown in FIG. 1 and tie-down attachment member (40) shown in FIG. 2. Specifically, in FIG. 3, one respective end of each strap 50 loops around pipe portion 110 of the tie-down attachment member. One end of the strap 50 loops around the pipe portion 110 from the right side thereof and is used to retain a respective pipeline (not shown), and an end of a second strap 50 crosses the first strap 50 and loops around pipe portion 110 from the left side. The second strap 50 is used to retain a second pipeline (also not shown). Referring again to FIG. 1, each anchor rod is adapted to be screw-driven into the ground G and to mount to a respective tie-down attachment member (40a, 40b, 40c).

In the embodiment of FIG. 1, anchor rods (21 in FIG. 2) of each respective anchoring device (20a, 20b, 20c) includes respective opposite upper and lower end portions (22a, 22b, 22c) and (23a, 23b, 23c). Each of these components is shown separately in FIGS. 4 and 5. In particular, the upper end portion (22) of each anchor rod, as shown in FIG. 5, has opposite upper and lower ends 220a and 220b, respectively. The upper end portion 220a may have a substantially solid metal, such as steel, body and a generally rectangular shape in transverse cross-section, although other suitable cross-sectional shapes are also contemplated within the scope of the invention, such as polygonal and circular. Each upper end portion 22 has a transverse opening 24 formed adjacent to its upper end 220a and a tubular section 25 formed at its lower end 220b. The tubular section 25 has a substantially rectangular configuration in transverse cross-section and is open at its lower end 25a and defines a pair of opposite holes 26 for receiving a suitable fastener, such as bolt 27 shown in FIG. 5.

Figure 4:
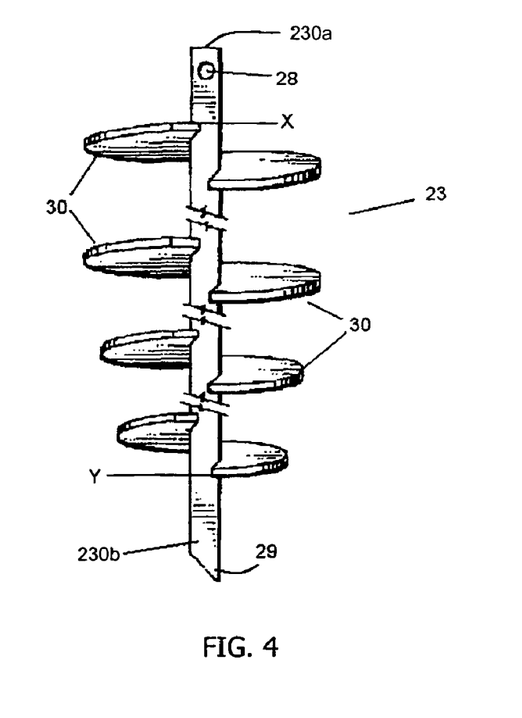
FIG. 4 is a perspective view of a lower end portion of an anchor rod used in connection with a pipeline buoyancy control assembly in accordance with one exemplary embodiment of the present invention.
Figure 5:
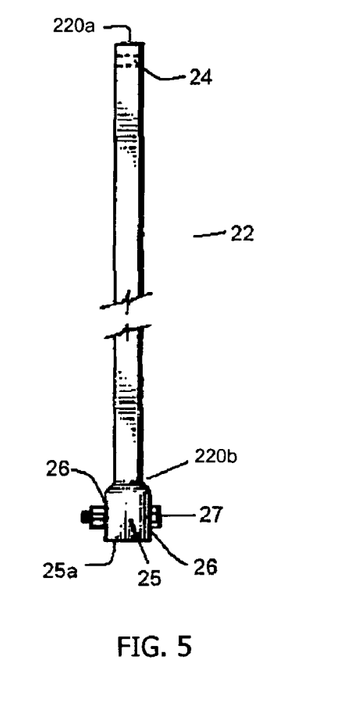
FIG. 5 is a perspective view of an upper end portion of an anchor rod used in connection with a pipeline buoyancy control assembly in accordance with one exemplary embodiment of the present invention.

The lower end portion (23) of each anchor rod 21, as shown in FIG. 4, also has respective opposite upper and lower ends 230a and 230b. In one exemplary embodiment, the lower end portion 23 of each anchor rod 21 may have a substantially solid metal, such as steel, body and a generally rectangular shape in transverse cross-section, although other suitable cross-sectional shapes are also contemplated within the scope of the invention, such as polygonal and circular. According to this embodiment, the lower end portion 23 of each anchor rod 21 has a transverse opening 28 formed adjacent to its respective upper end 230a and a wedge-shaped point 29 formed at its respective lower end 230b.

The upper end 230a of the lower end portion 23 engages with the tubular section 25 of the upper end portion 22. Upon this engagement, hole 26 in upper end portion 22 and hole 28 in lower end portion 23 align with each other such that the suitable fastener 27, such as a bolt, can pass therethrough to secure the upper and lower end portions 22 and 23 to one another. According to a further embodiment of the invention, a plurality of upper end portions 22 are attached to one another by securing fastener 27 of one section through hole 24 of another section to provide a variable length anchor device. For example, upper end portions 22 are provided in varying length sections, such as 3, 5, 7 and 10 feet, and one or more section is used to provide the needed length to accommodate the respective pipeline diameter and terrain to which the pipeline is to be retained. Lower end portion 23 is then attached to the upper section 22.

The lower end portion 23 of each anchor rod 21 can be driven into the ground G (FIG. 1) or other load-bearing strata. The wedge-shaped point 29 reduces the amount of force required to insert the lower end portion 23 of each anchor rod 21 into the ground G. The lower end portion 23 of the anchor rod 21 also has a helical screw 30 formed thereon for assisting in driving the anchor rod 21 into the ground and retaining the lower end portion 23 within the ground G as the anchor rod 21 is rotatably inserted, or screwed, into the ground G. As shown in FIG. 4, for example, a helical screw 30 in accordance with one exemplary embodiment of the invention has one or more substantially circular helical bearing plate that have individual diameters that generally decrease from a location X in the proximity of hole 28 to a location Y in the proximity of point 29.

According to a further exemplary embodiment, the tie-down attachment member is slidably and rotatably engaged with the upper-most section of anchor rod. Further, as mentioned previously, straps such as strap 50 in FIG. 3 are attached to the tie-down attachment member to retain the respective pipeline against buoyancy forces.

Figure 9:
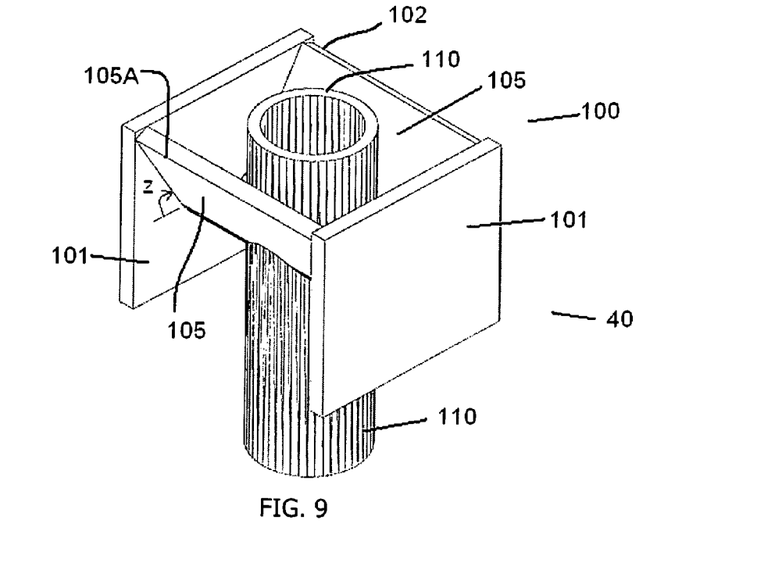
FIGS. 9-11 are respective isometric, top and side perspective views of a tie-down attachment member used in connection with a pipeline buoyancy control assembly in accordance with one exemplary embodiment of the present invention.
Figure 10:
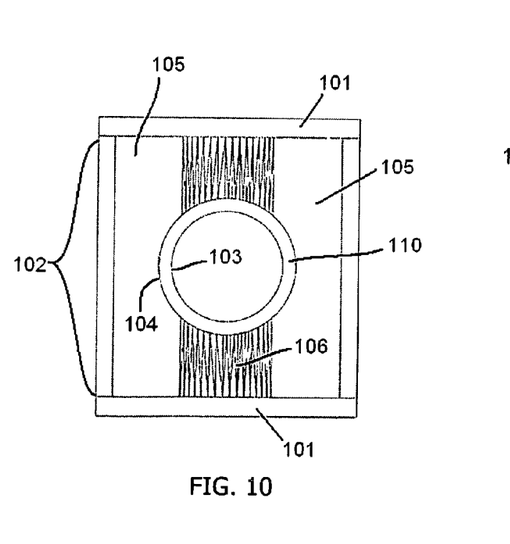
Figure 11:
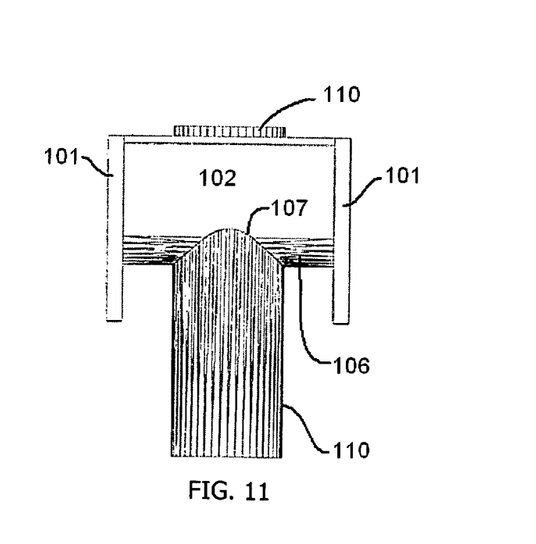

As shown in FIGS. 9-11, each tie-down attachment member 40 includes a body portion attached to a pipe portion 110. The body portion includes two opposing sidewall structures 101 attached on respective sides of a curved center plate 102. According to this embodiment, sidewalls 101 and center plate 102 are made of ⅜-inch thick steel and are rectangular. However, a skilled artisan would understand that other materials, such as aluminum, as well as other shapes, such as circular or polygonal, and material thickness, could also be used without departing from the scope of the invention.

As shown more clearly in FIGS. 10 and 11, center plate 102 comprises a single, substantially flat, piece of metal material bent upward in an inverted "C", or saddle-shape, configuration. Center plate 102 has two substantially flat and preferably smooth outer sections 105 respectively flanking a bend section 106 located midway between the two outer sections 105. Outer sections 105 form an angle, Z, with respect to the bottom edge of sidewalls 101, as shown in FIG. 9, which is greater than or equal to 60 degrees and, which is preferably between 60 and 90 degrees. More particularly, the greater the value of angle Z, the more potential stress on straps 50 (FIG. 2) is avoided.

For example, referring to in FIG. 1, if straps 50a and 50b stretch under the strain of pipes P1 and P2 rising due to buoyancy forces on the pipes, the greater the force between the strap and the top edge, for example 105A in FIG. 9, of center plate 102. Accordingly, to reduce the strain between the strap and the tie-down attachment member 40, the smooth outer sections 105 of the center plate 102 are bent upwards, i.e., in the same direction as the buoyancy forces, to an angle sufficient to minimize the stress between the straps and the upper-most portion 105A of the center plate 102.

Further, according to this embodiment, a hole 107 is formed within center plate 102 to accommodate pipe portion 110 which is made of a 9-inch long section of steel pipe having an outside diameter of 2⅞ inches; however, other lengths and diameter pipes can also be used. According to this embodiment, all of the components of tie-down attachment member 40 are permanently secured to each other using an attachment method such as welding.

Tie-down attachment member 40 is attached to the upper-most section of the anchor rod 21, as shown in FIG. 1, by sliding the pipe portion 110 over the outside surface of anchor rod 21 and attaching a retainer section 45 to the top of anchor rod 21. Retainer section 45 can be any device that retains tie-down attachment member 40 from sliding off the top of anchor rod 21. According to the exemplary embodiment illustrated, however, retainer section 45 is similar in construction to the lower portion of upper end portion 22 of anchor rod 21. That is, as shown for example in FIGS. 6A and 6B, retainer 45 according to this embodiment includes a tubular section 325 with a substantially rectangular configuration in transverse cross-section and which is open at its lower end 325A and which defines a pair of opposing holes 326 for receiving a suitable fastener, such as bolt 327. In the embodiment of FIG. 1, after tie-down attachment 40 is placed over the top of anchor rod 21, retainer 45 is placed on top of the upper end portion 22a of the anchor rod and holes 326 in the retainer and hole 24 (FIG. 5) are aligned and fastener 327 is placed through the holes to attach retainer 45 to the anchor rod 21.

Figure 7:
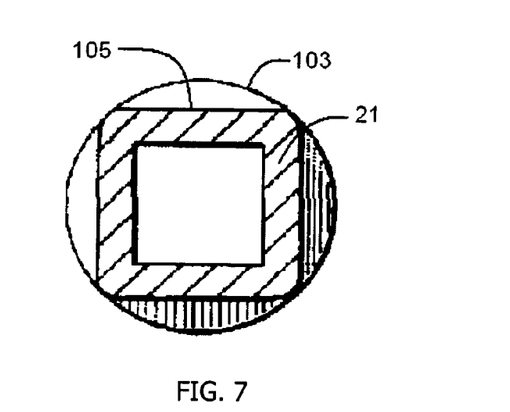
FIG. 7 is a cutaway view showing the engagement of an upper end portion of an anchor rod and a tie-down attachment member used in connection with a pipeline buoyancy control assembly in accordance with one exemplary embodiment of the present invention.

Further, as shown for example in FIG. 7, the inside diameter 103 (as opposed to outside diameter 104) of pipe portion 110 is larger than the outer-most surface 105 of the upper section of anchor rod 21. Accordingly, once installed, tie-down attachment member 40 is free to rotate as much as 360 degrees about anchor rod 21 because the friction between pipe portion 110 and anchor rod 21 is minimal. Additionally, this minimal friction also permits tie-down attachment member 40 to freely slide vertically up and/or down on anchor rod 21 between the ground G and retainer 45. For example, referring again to FIG. 1, upon experiencing upward buoyancy forces one or both of pipes P1 and P2 rise, forcing straps 50a and/or 50b to pull their respective tie-down attachment members 40 upwards along respective anchor rods 21 until the tie-down attachment members reach the retainers 45, at which time no further upward movement of the pipes occurs.

Further, if it is desired to reduce or remove the vertical distance by which the respective pipes are permitted to traverse, shown respectively as Y1 and Y2 for pipes P1 and P2 in FIG. 1, a driving device (not shown) can be attached to a retainer 45 and the respective anchor rod 21 can be further driven into the ground G. Because the tie-down attachment member 40 is free to rotate about its respective anchor rod 21, the additional rotational driving force is not translated to the tie-down attachment member 40 and, thus, no detrimental forces are exerted on the pipes, other than the desired downward force applied as the tie-attachment member and the strap attached thereto are driven downward.

While various aspects of the present invention have been particularly shown and described with reference to the exemplary, non-limiting, embodiments above, it will be understood by those skilled in the art that various additional aspects and embodiments may be contemplated without departing from the spirit and scope of the present invention. For example, a skilled artisan would understand that various different types of materials can be used to manufacture the tie-down attachment members and different sizes and dimensions are also contemplated depending on the sizes of the pipes retained. Furthermore, it is also contemplated that the angle Z, shown for example in FIG. 9, can be smaller than 60 degrees if necessary to accommodate placing the anchor devices farther from the pipe which it is retaining.

It would be understood that a device or method incorporating any of the additional or alternative details mentioned above would fall within the scope of the present invention as determined based upon the claims below and any equivalents thereof.

Other aspects, objects and advantages of the present invention can be obtained from a study of the drawings, the disclosure and the appended claims.

What is claimed is:

1. A tie-down attachment member for tying down a buoyant device, the attachment member comprising:
    a body portion having a center plate with a substantially flat portion disposed at each end and along a length of said body portion and creating a different respective plane, and a curved center portion disposed between the flat portions, and two opposing side plates fixedly attached to respective sides of the center plate; and
    an elongated stem portion disposed in an aperture formed in said body portion, wherein said stem portion intersects one or more of the different respective planes, wherein the center plate of said body portion has an inverted saddle shape and the aperture of said body portion is disposed through a vertex of the curved center portion.

2. A pipeline buoyancy control assembly for retaining a buoyant pipeline, the assembly comprising:
    an anchor device having at least two ends, wherein at least one of the ends is for attaching to a fixed object;
    a tie-down attachment member in operational engagement with an end of said anchor device, wherein said tie-down attachment member is operable to either move along a length of said anchor device, rotate about an axis of said anchor device, or move along the length of said anchor device and rotate about the axis of said anchor device;
    at least one tie-down strap each strap being attached to said tie-down attachment member and operable to retain the pipeline; and
    a retainer device attached to said anchor device and operable to restrict movement of said tie-down attachment member beyond a specified location on the length of said anchor device, wherein
    said tie-down attachment member includes a body portion having a center plate with a substantially flat portion disposed at each end and along a length of said body portion and creating a different respective plane, and a curved center portion disposed between the flat portions, and two opposing side plates fixedly attached to respective sides of the center plate and an elongated stem portion disposed in an aperture formed in said body portion, wherein said stem portion intersects one or more of the different respective planes.

3. The pipeline buoyancy control assembly claimed in claim 2, wherein the center plate of the body portion has an inverted saddle shape.

4. The pipeline buoyancy control assembly claimed in claim 3, wherein the elongated hollow stem portion of said tie-down attachment member is hollow and has an inside diameter larger than an outside diameter of said anchor device and said anchor device is disposed through the elongated hollow stem portion of said tie-down attachment member.

5. The pipeline buoyancy control assembly claimed in claim 3, wherein said anchor device includes a drilling section for penetrating the fixed object and an extendible shaft section, wherein the extendible shaft section has a first end operable to attach to the drilling section and a second end for engaging with said tie-down engagement member.

6. A pipeline buoyancy control assembly for retaining a buoyant pipeline, the assembly comprising:
    an anchor device having at least two ends, wherein at least one of the ends is for attaching to a fixed object;
    a tie-down attachment member in operational engagement with an end of said anchor device, wherein said tie-down attachment member is operable to move along a length of said anchor device, rotate about an axis of said anchor device, or move along the length of said anchor device and rotate about the axis of said anchor device;

at least one tie-down strap each strap being attached to said tie-down attachment member and operable to retain the pipeline; and a retainer device attached to said anchor device and operable to restrict movement of said tie-down attachment member beyond a specified location on the length of said anchor device, wherein said tie-down attachment member includes a body portion having a center plate having a substantially flat portion disposed at each end and along a length of said body portion and a curved center portion disposed between the flat portions, and two opposing side plates fixedly attached to respective sides of the center plate and an elongated stem portion disposed in an aperture formed in said body portion, wherein said stem portion is fixedly attached to said body portion.

7. The pipeline buoyancy control assembly claimed in claim 6, wherein the elongated hollow stem portion of said tie-down attachment member is hollow and has an inside diameter larger than an outside diameter of said anchor device and said anchor device is disposed through the elongated hollow stem portion of said tie-down attachment member.

8. The pipeline buoyancy control assembly claimed in claim 6, wherein said anchor device includes a drilling section for penetrating the fixed object and an extendible shaft section, wherein the extendible shaft section has a first end operable to attach to the drilling section and a second end for engaging with said tie-down engagement member.

\* \* \* \* \*